United States Patent
Carder et al.

(10) Patent No.: US 11,462,891 B2
(45) Date of Patent: Oct. 4, 2022

(54) WIRE PULLER LIFT DOLLY

(71) Applicant: Trio Electric, LLC, Houston, TX (US)

(72) Inventors: Darrell Carder, Houston, TX (US); Jarrod Pollock, Houston, TX (US)

(73) Assignee: Trio Electric, LLC, Houston, TX (US)

( * ) Notice: Subject to any disclaimer, the term of this patent is extended or adjusted under 35 U.S.C. 154(b) by 85 days.

(21) Appl. No.: 16/865,585

(22) Filed: May 4, 2020

(65) Prior Publication Data

US 2021/0344178 A1 Nov. 4, 2021

(51) Int. Cl.
*H02G 1/08* (2006.01)
*B66F 5/04* (2006.01)

(52) U.S. Cl.
CPC .............. *H02G 1/085* (2013.01); *B66F 5/04* (2013.01)

(58) Field of Classification Search
CPC .............. H02G 1/085; B66F 5/04; B62B 1/14
See application file for complete search history.

(56) References Cited

U.S. PATENT DOCUMENTS

| 6,062,802 | A  | * | 5/2000 | Aenchbacher | ............ | B62B 1/14 |
|   |   |   |   |   |   | 187/237 |
| 6,530,740 | B2 | * | 3/2003 | Kim | ........................ | B62B 1/002 |
|   |   |   |   |   |   | 180/251 |
| 2016/0325770 | A1 | * | 11/2016 | Wilcox | ................. | B62B 5/0003 |

* cited by examiner

*Primary Examiner* — Tyrone V Hall, Jr.
(74) *Attorney, Agent, or Firm* — John G. Posa; Belzer P.C.

(57) ABSTRACT

Apparatus adapted for use with an existing wire tugger includes a primary frame, a slide frame configured to receive the wire tugger, and a jack that causes the slide frame and existing wire tugger to move up and down, thereby enabling a user to position the upper end adapter of the existing wire tugger proximate to an overhead wire pull location. The system enables the existing wire puller to be transported and physically oriented to address a broader range of overhead wire pulling applications on jobsites. A wheeled cart facilitates traversing throughout jobs and vertical wire-puller mounting, thereby mitigating space constraints while allowing for easier set-up and a broader range of uses. Various interchangeable end adapters facilitate temporary coupling and stabilization with respect to different conduit sizes.

18 Claims, 3 Drawing Sheets

(Fig. 1)

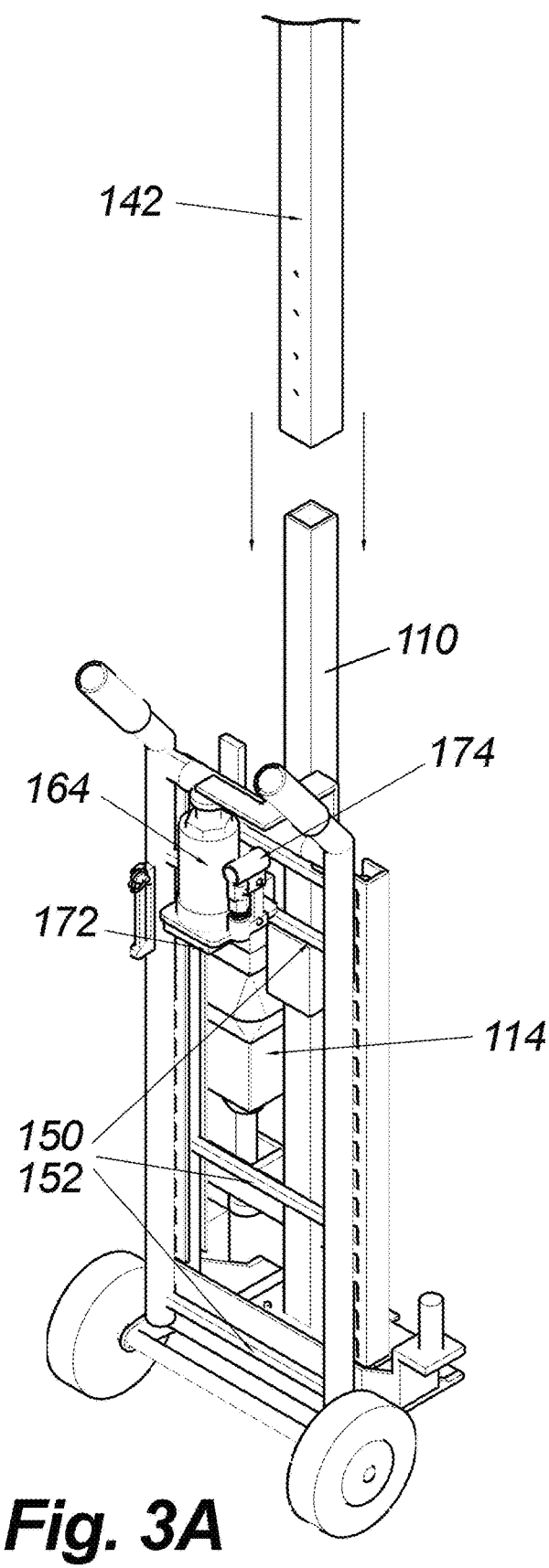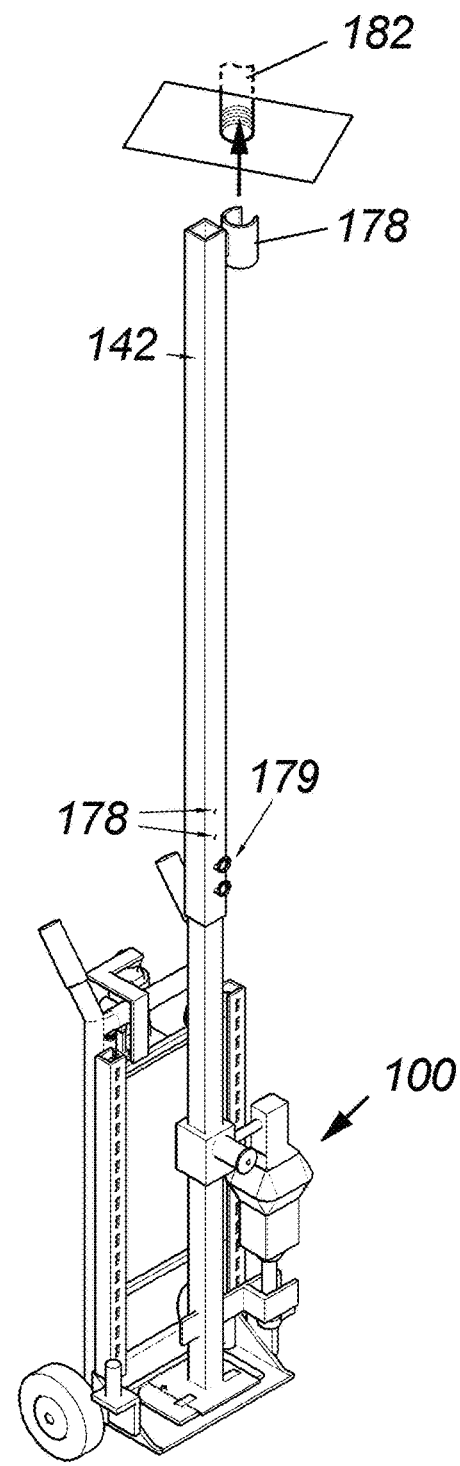
Fig. 3A
Fig. 3B

WIRE PULLER LIFT DOLLY

FIELD OF THE INVENTION

This invention relates generally to electrical apparatus and, in particular, to wire pullers. More particularly, the invention is directed to a hand truck or dolly used to transport and lift a wire puller to intended locations, including overhead and ceiling pull points.

BACKGROUND OF THE INVENTION

The electrical industry currently has wire-pulling machines and methods in place. FIG. 1 is a drawing that shows an existing, commercially available wire puller or "tugger," depicted generally at 100. This particular unit is a "3K puller," so named because it is capable of exerting three thousand pounds of pull force. Other strength pullers are available, including 1K, 3K, 6K, 10K, and so forth, and this invention is not limited in this regard.

The device 100 includes a proximal end 104 that functions as a base, and a distal end 102 that articulates with a rigid, elongated arm 106. The end 102 terminates in an end 120 that is configured to accept various adapters 122 associated with different conduit sizes. The arm 106 is in turn telescopically coupled to a section 110 through hitch pin 112. Section 110 forms part of a frame to which there is mounted a high-torque motor 114 including an electrical cord connected to power and a user control (not shown). The motor 114 drives a capstan winch 118.

In use, the device 110 is configured by placing the base on the floor or other stable surface, and the angle of end 102 is adjusted so that adapter 122 on end 120 may be coupled to the end of a conduit, to an overhead box, for example. The end of the unit is adjusted with hitch pin 112, and the angle is set with joint 108. A fish tape is typically used to feed a pulling rope to a wire source, and the free end of the pulling rope is attached to the wire(s). The pulling rope is then wound around winch spool 118 and motor 114 is activated to pull the wire(s) into the box.

While existing wire-pulling machines such as the one just described may be configured for a different pull situation, existing units have constraints, including high cost, ease of set-up/use due to bulky rigs, and/or jobsite space constraints. Existing wire pullers are heavy, limiting mobility and operation. Conventional pullers are really intended and designed for wall-mounted electrical panels. As such, damage to conduit and boxes may occur due to excessive pressure created while pulling a large amount of wire from overhead pull points.

When attempting to pull wire straight down from an overhead electrical box, every wire puller in the current electrical industry applies extreme force that will often result in the box being ripped from the ceiling. Conventional wire pullers are designed to be set up with an angle commonly around 45 degrees from the horizontal of a box to the wire puller. As a result, existing wire pullers must be based near a panel, and the wire must be at a box in the field. There is little if any flexibility associated with pull-point location, such that the wire, which tends to be very bulky and heavy, must be moved between each pull. This generally consumes many labor hours and creates numerous safety risks.

Given the constraints just described, there remains an outstanding need in the industry to increase the versatility and applicability of commercial wire pullers, especially when it comes to overhead pull scenarios.

SUMMARY OF THE INVENTION

This invention enables an existing wire puller to be transported and physically oriented to address a broader range of overhead wire pulling applications on jobsites. By alleviating unwanted stress resulting from the use of a standard wire puller, the invention allows a greater quantity of wire to be pulled more quickly, as well as more complex pulls to be achieved without damaging overhead supports or altering installed conduit.

In contrast to existing solutions, the invention facilitates vertical wire-puller mounting, thereby mitigating space constraints while allowing for easier set-up and a broader range of uses on a jobsite. With the inclusion of a wheeled cart, the system also makes traversing throughout jobsites with a conventional wire puller easier. The invention enables the wire puller to be set up directly underneath overhead pull locations—wherever they may be located—rather than being constrained to use at a panel. The vertical set-up allows for a secured, single connection to overhead pull boxes, which facilitates quicker, easier, and larger wire pulls without causing damage to overhead conduit or pull boxes. The vertical orientation reduces the amount of space required, allowing use at locations where traditional wire pullers cannot be situated.

Apparatus according to the invention is adapted for use with an existing wire tugger having a lower base coupled to an elongated arm terminating in an upper end adapter. The apparatus includes a primary frame including front, back, upper, lower and two opposing side portions. A pair of opposing, ground-contacting wheels are supported for rotation on the lower opposing side portions of the primary frame. A slide frame, coupled to the front portion of the primary frame, includes front, back, upper, lower and two opposing side portions. A structure on the slide frame enables the existing wire tugger to be temporarily and removable affixed to the slide frame. A jack coupled between the stationary frame and the slide frame causes the slide frame and existing wire tugger to move up and down relative to the ground surface, thereby enabling a user to position the upper end adapter of the existing wire tugger proximate to an overhead wire pull location.

In the preferred embodiment the jack is a manually operated jack such as a manually operated bottle jack. The jack may be mounted to the primary frame, with the jack including an extensible piston coupled to the slide frame. One or more hand grips extending from the upper rear portion of the primary frame. The upper end adapter may be provided with the existing wire tugger, and may include an angle-adjustable joint. Alternatively, the existing upper end adapter is removable and replaceable with an elongated arm terminating in an adapter head having collar dimensioned to temporarily couple to and stabilize the end of an electrical conduit.

BRIEF DESCRIPTION OF THE DRAWINGS

FIG. 3A is a drawing of the preferred embodiment seen from a different perspective showing the installation of an extension bar; and FIG. 3B shows the adapter of FIG. 3A approaching the end of a conduit associated with an overhead pull point.

DETAILED DESCRIPTION OF THE PREFERRED EMBODIMENTS

Figure 1:
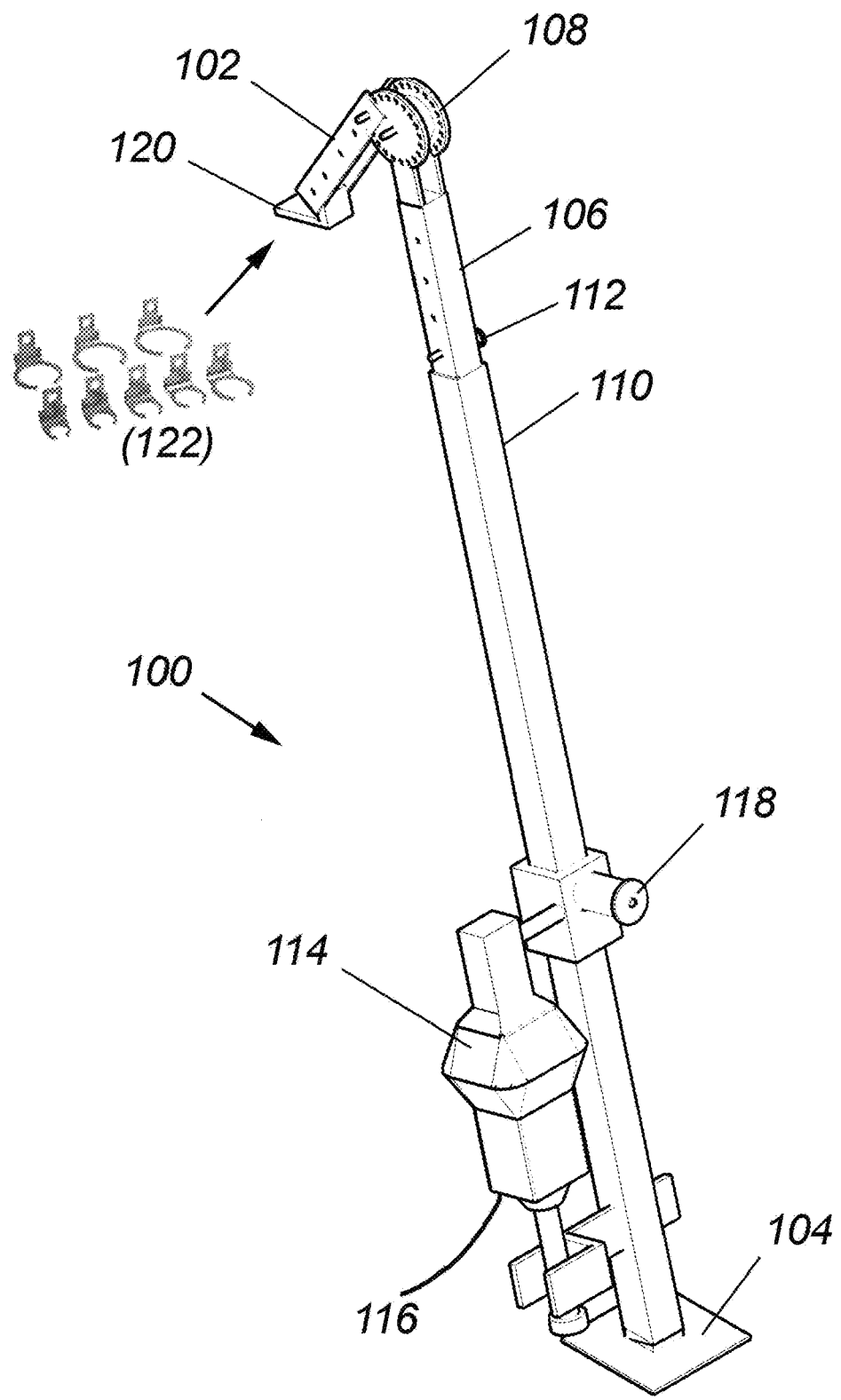
FIG. 1 is a drawing of an existing, commercially available wire puller.
Figure 2:
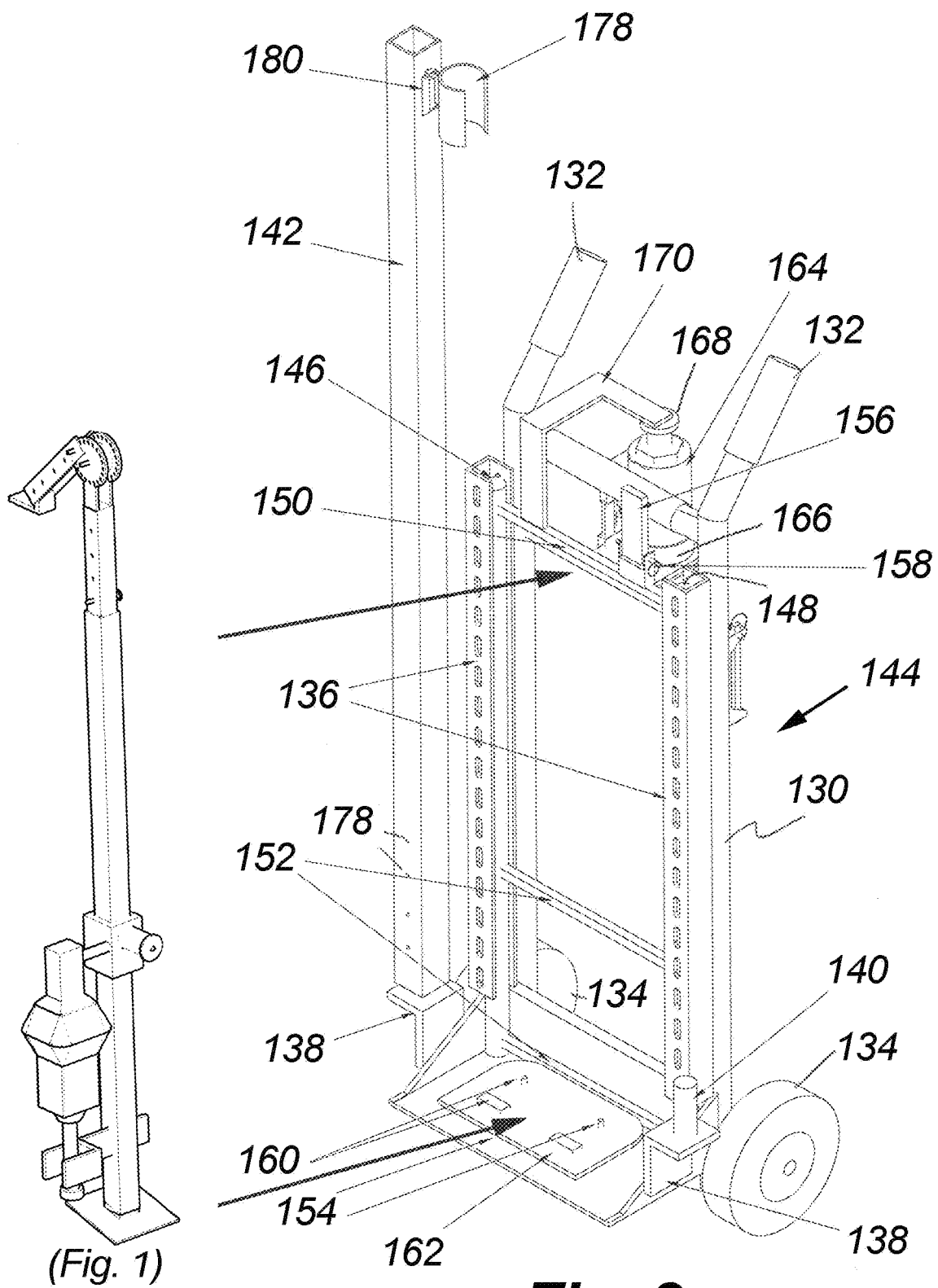
FIG. 2 is a perspective drawing of a preferred embodiment of the invention configure to receive the wire puller of FIG. 1A mounted thereon.

Having discussed the wire puller of FIG. 1 in the Background of the Invention, the reader's attention is now directed to FIG. 2, which illustrates a preferred embodiment of the invention adapted to receive the wire puller of FIG. 1. The system includes a rigid frame 130 having an upper portion with opposing handles 132 and a lower portion with opposing wheels 134. A pair of opposing slide tube tracks 136 are also rigidly attached to the frame 130. The bottom of the frame includes right and left extension bar mounts 138, each with upwardly extending posts 140. Each mount 138 is configured to removably hold extension bars in an upright orientation. One of the mounts 138 is shown holding extension bar 140, which comprises part of the invention as described below. Either mount may also be used to temporarily hold the elongated arm 106 and upper components of the puller 100, also described below. A spare hitch pin 144 may also be optionally supported on the frame 130.

The system further includes a vertically moveable slide frame comprising opposing side tubes 146, 148, rigidly interconnected with cross members 150, 152. The lower portion of the slide frame includes a platform 154, and an upper member 156 connected to the slide frame through a quick-release hitch pin 158. The existing wire puller 100 is mounted on the slide frame with the base 104 of the puller coupled to the platform 154 and the extension bar on the puller coupled to upper member 156.

The base and arm of the puller may be respectively connected to the platform and member 156 of the system in any appropriate manner so long as the puller is removably secured to the slide frame. For example, base 104 of the puller 100 may be secured to platform 154 through 160, 162. The arm of the puller, which may be the arm 106 provided with the puller of proprietary extension bar 142, may be attached to member 156. Extension bar 142 includes an adapted head 178 mounted on bar 142 through receiver 180. A plurality of adapter heads may be provided, including heads with inside diameters to accommodate electrical conduit on varying diameter, such as ¾", 1", 1.5", 2", and so forth.

A jack 164 includes a lower portion 166 rigidly coupled to the frame 130, and an upper piston 168 operative to apply force to angled member 170. Angled member 170 is rigidly coupled to the slide frame, such that as the jack is extended, the slide frame and wire puller mounted thereon moves vertically. The jack 164 is a commercially available bottle jack and, as shown in FIG. 2, the bottom portion of the jack 164 mounts on platform 172. Bottle jack 164 is manually operated using a lever inserted into sleeve 174. Various jacks are applicable to the invention, with extension lengths in the range of 12 to 24", more typically in the range of 16".

In use, the system, which functions as a wire puller lift dolly, is manually wheeled to a location with the wire puller mounted thereon. For low ceilings, it may be possible to adjust and use the arm 106 and adapters 122 that come with the puller. However, for most applications, including higher overhead pull points, the invention contemplates removal of puller arm 106, placement of the arm 106 on one of the mounts 108, and installation of extension bar 142 onto the puller using holes 178 and hitch pin 112 or 144. A plurality of holes 178 are provided along bar 142 for height adjustment, with pins 170 holding the bar 142 in position. The appropriate adapter 178 is mounted on bar 142, and the puller is lifted with the jack 164 until the adapter surrounds the end of the conduit.

FIG. 3A is a drawing of the preferred embodiment seen from a different perspective showing the installation of an extension bar, and FIG. 3B shows an adapter 178 approaching the end of conduit 182 prior to 'capturing' the end of the conduit. From this point, wire(s) may be pulled overhead and through the conduit without concern for unwanted lateral i.e., side-to-side movements that may disrupt the conduit or cause damage to electrical boxes or building structures.

In summary, the system incorporates and integrates a combination of custom fabricated, inventive components that together allow for easier, quicker, and more versatile wire pulls while using a conventional wire puller. Indeed, the resultant "wire-puller lift dolly" may be used anywhere in the field where a ceiling pull point is accessible. The system allows for easy, one-time mounting of a 3K or other wire puller, and effortless mobility throughout a jobsite.

The system sets up vertically, directly under an overhead pull point, and easily boosts the extension bar so that the adapter head connects with the overhead pull point. The adapter head eliminates the risk of damage to conduit and overhead pull points that may have otherwise occurred from excess pressure during wire pulls. The vertical set-up reduces the amount of space required for use that would have otherwise been consumed by and/or created use constraints by bulky traditional wire pullers, thus mitigating space constraints. The inventive application allows a user to safely roll the jack to any location on a jobsite and directly mount the wire puller to an overhead conduit/box. The apparatus sets up vertically, reducing the amount of space consumed by the rig.

In addition to the advantages already described herein, the invention enables wire(s) to be pulled into an overhead pull point, enabling electrical routing from the branch systems of the electrical network and to the point of the "homeruns" or electrical panels. This is in contrast to existing methodologies, wherein wires are pulled through wall panels limiting the possibility of a more desirable overall electrical system layout.

The invention claimed is:

1. Apparatus adapted for use with an existing wire tugger having a lower base coupled to an elongated arm terminating in an upper end adapter, the apparatus comprising:
 a primary frame including front, back, upper, lower and two opposing side portions;
 a pair of opposing, ground-contacting wheels supported for rotation on the lower opposing side portions of the primary frame;
 a slide frame coupled to the front portion of the primary frame, the slide frame including front, back, upper and lower portions;
 a mounting structure on the slide frame enabling the existing wire tugger to be temporarily and removably affixed to the slide frame;
 wherein the mounting structure includes a platform extending outwardly from the lower portion of the slide frame with a plurality of elements configured to receive the lower base of the existing wire tugger, and a member extending outwardly from the upper portion of the slide frame configured for coupling to the elongated arm of the existing wire tugger; and a jack coupled between the primary frame and the slide frame, the operation of the jack causing the slide frame and existing wire tugger to move up and down relative to the ground surface, thereby enabling a user to position the upper end adapter of the existing wire tugger proximate to an overhead wire pull location.

2. The apparatus of claim 1, wherein the jack is a manually operated jack.

3. The apparatus of claim 1, wherein the jack is a manually operated bottle jack.

4. The apparatus of claim 1, wherein:
the jack is mounted to the primary frame; and
the jack includes an extensible piston coupled to the slide frame.

5. The apparatus of claim 1, further including a hand grip extending from the upper rear portion of the primary frame.

6. The apparatus of claim 1, wherein the lower portion of the slide frame includes at least one side mount adapted to removably store a wire tugger extension bar in an upright orientation.

7. The apparatus of claim 1, including the existing wire tugger.

8. The apparatus of claim 7, wherein the upper end adapter of the wire tugger includes an angle-adjustable joint.

9. The apparatus of claim 7, wherein the upper end adapter of the wire tugger includes a removable and replaceable elongated arm terminating in an adapter head having a collar dimensioned to temporarily couple to and stabilize the end of an electrical conduit.

10. Apparatus for transporting and positioning a wire tugger, comprising:
a wire tugger having a lower base coupled to an elongated arm terminating in an upper end adapter;
a primary frame including front, back, upper, lower and two opposing side portions;
a pair of opposing, ground-contacting wheels supported for rotation on the lower opposing side portions of the primary frame;
a slide frame coupled to the front portion of the primary frame, the slide frame including front, back, upper and lower portions;
a mounting structure on the slide frame enabling the existing wire tugger to be temporarily and removably affixed to the slide frame; and
a jack coupled between the stationary frame and the slide frame, the operation of the jack causing the slide frame and existing wire tugger to move up and down relative to the ground surface, thereby enabling a user to position the upper end adapter of the existing wire tugger proximate to an overhead wire pull location.

11. The apparatus of claim 10, wherein the mounting structure on the slide frame includes:
a lower platform with a plurality of elements configured to receive the lower base of the existing wire tugger; and
a member extending from the upper portion of the slide frame adapted for coupling to the elongated arm of the existing wire tugger.

12. The apparatus of claim 11, wherein the jack is a manually operated jack.

13. The apparatus of claim 11, wherein the jack is a manually operated bottle jack.

14. The apparatus of claim 11, wherein:
the jack is mounted to the primary frame; and
the jack includes an extensible piston coupled to the slide frame.

15. The apparatus of claim 11, further including a hand grip extending from the upper rear portion of the primary frame.

16. The apparatus of claim 11, wherein the upper end adapter is provided with the existing wire tugger, and includes an angle-adjustable joint.

17. The apparatus of claim 16, wherein the existing upper end adapter is removable and replaceable with an elongated arm terminating in an adapter head having collar dimensioned to temporarily couple to and stabilize the end of an electrical conduit.

18. The apparatus of claim 11, wherein the lower portion of the slide frame includes at least one side mount adapted to removably store a wire tugger extension bar in an upright orientation.

\* \* \* \* \*